United States Patent [19]
Watanabe et al.

[11] Patent Number: 5,997,169
[45] Date of Patent: Dec. 7, 1999

[54] CONTROL APPARATUS FOR MANUFACTURING SYSTEM AND METHOD OF CONTROLLING THEREFOR

[75] Inventors: Yuzuru Watanabe, Fuji; Toshio Tsuchiya, Numazu, both of Japan

[73] Assignee: Toshiba Kikai Kabushiki Kaisha, Tokyo, Japan

[21] Appl. No.: 08/958,314

[22] Filed: Oct. 27, 1997

[30] Foreign Application Priority Data

Oct. 25, 1996 [JP] Japan .................................. 8-283828

[51] Int. Cl.$^6$ ..................................................... G06F 15/46
[52] U.S. Cl. .................................. 364/374.1; 364/468.22; 364/474.22; 364/478.18
[58] Field of Search ............................... 364/474.01, 468, 364/478, 468.22, 478.05, 468.19, 474.02, 474.1

[56] References Cited

U.S. PATENT DOCUMENTS 5,381,339 1/1995 Yaco et al. .............................. 364/468
5,392,207 2/1995 Wilson et al. ....................... 364/167.01

Primary Examiner—Emmanuel L. Moise
Assistant Examiner—Esaw Abraham
Attorney, Agent, or Firm—Fish & Richardson, P.C.

[57] ABSTRACT

An apparatus for controlling a manufacturing system comprises a display device, including a pallet designation area for selecting a desired pallet and a machine tool designation area for selecting a desired machine tool, for displaying an operating status of the manufacturing system, an inputting device for selecting the desired pallet designation area and executing a moving operation to the desired machine tool designation area, and a conveyance controlling device for executing the control to carry the pallet indicated in the pallet designation area toward the machine tool indicated in the machine tool designation area in accordance with the moving operation performed by this inputting device. When starting up a manual conveying function for setting a remote conveyance indication by using this apparatus, a system status display screen is displayed. A pallet to be conveyed is selected from a pallet designation area on this system status display screen and dragged the pallet to a position of a station or a working device to which the pallet should be carried, and dropped. With such operations, a single indication of the remote conveyance is registered, and the conveyance is started. A conveyance setting screen is not displayed in overlap on the system status display, and therefore the conveyance can be indicated while monitoring the system.

8 Claims, 6 Drawing Sheets

CONTROL APPARATUS FOR MANUFACTURING SYSTEM AND METHOD OF CONTROLLING THEREFOR

BACKGROUND OF THE INVENTION

The present invention relates generally to a control apparatus for controlling manufacturing system and a method of controlling a manufacturing system and, more particularly, to an apparatus for and a method of controlling a remote conveyance of a flexible manufacturing system (FMS) with displaying a system status information.

In general, the FMS is constructed of a numerical controlled machine tool, a conveying device and a numerical controller, etc. Then, the numerical controlled machine tool is controlled based on manufacturing data such as a working order, part numbers and the number of workpieces provided from the numerical controller. Herein, data needed when conveying the workpiece on the basis of the manufacturing data, are displayed on a display screen in a handling station, and an operator selects an item from a content of the display screen, thereby executing the remote conveyance.

In the remote conveyance in the prior art FMS, specifically the following operations are implemented.

FIG. 5 is a flowchart showing operations of the remote conveyance in the prior art FMS.

First of all, when starting up a manual conveying function (step S201), a system status display is displayed on a display unit in the FMS (step S203).

FIG. 6 shows one example of display contents of the conventional system status display screen displayed in step S203.

Herein, [Setting], [Data Management], [Operation Management], [Achievement Management], [Maintenance], [Help] etc. are displayed by way of a menu 51 in an upper part on the screen, and can be selected by properly clicking it by a mouse etc. Further, a [Scheduled Operation] 52 is [Off-line], and a [Mode] 53 is [Manned]. Moreover, [YY-MM-DD] (Year/Month/Date) data 54 is displayed. Further, in FIG. 6, an arrangement station #1 indicates [Standby].

Furthermore, a box 55 containing pallet numbers 1–16 for the respective pallets is displayed, and arrangement stations 56 (#1, #2) and working devices 57 (MC#1, MC#2) are displayed.

Herein, when properly selecting an item of [Setting] etc. in the menu 51 (step S205), a window for setting is displayed (step S207).

FIG. 7 shows one example of display contents of a conventional setting screen.

This setting screen 60 is displayed as a window overlapped on the system status display screen which has previously been displayed. Displayed on this setting screen are a pallet number setting area 61, conveying location setting areas 62, 63, and a conveyance mode setting area 64, which are selectable by a mouse etc. Further, a remote conveyance indication area 65 in which the set data are displayed, is also provided. Moreover, in addition to the [Registration] button 66, respective buttons for [Deletion], [Help] and [End] are provided.

Herein, to start with, a number of a pallet to be carried is selected in the pallet number setting area 61 (step S209). Then, an item of conveying location data indicating a location from and/or to which the selected pallet should be carried is set in the conveying location setting area [From] 62 and/or the conveying location setting area [To] 63 (step S211). Further, a conveying mode setting area 64 is set as the necessity arises. When the settings described above are effectuated, respective items of data are displayed in the remote conveyance indication area 65. In this example, there is indicated an operation of taking the pallet marked with the pallet number 1 out of a stocker and conveying this pallet. Note that the process is in an unselected status as to where the pallet should be carried.

The operator confirms a content of the display of the remote conveyance indication area 65 and, when the setting is finished, pushes the [Registration] button 66 (step S213). If this conveyance is possible (step S215), the setting contents are written to a file (step S217). Whereas if the conveyance is impossible (step S215), an error is displayed (step S219).

With these operations, the single indication of the remote conveyance is registered, and the carrying is thus started.

According to the prior art operating method, however, the setting screen as shown in FIG. 7 is displayed overlapped on the system display screen, and hence the system status display on which statuses of the respective devices and a working state of the workpiece are displayed, is hard to see, resulting in such a problem that it is incapable of appropriately monitor the system.

SUMMARY OF THE INVENTION

Accordingly, it is a first object of the present invention to provide an operating apparatus which provides a visible system status display on which a state of each device and a working status of a workpiece are displayed, and setting of a remote conveyance indication while monitoring the system status.

It is a second object of the present invention to provide an operating method of effectively indicating the remote conveyance by use of the above operating apparatus.

According to a first aspect of the present invention, the indication of the remote conveyance is set by use of an inputting device such as mouse etc. on system status display screen on which to monitor statuses of an NC machine tool, a carrying device, an arrangement station and a cleaning device that constitute an FMS, or an on-pallet state of the workpiece.

To be specific, according to the first aspect of the present invention, an apparatus for controlling a manufacturing system comprises a display device, including a pallet designation area for selecting a desired pallet and a machine tool designation area for selecting a desired machine tool, for displaying an operating status of the manufacturing system, an inputting device for selecting the desired pallet designation area and executing a moving operation to the desired machine tool designation area, and a conveyance controlling device for executing the control to carry the pallet indicated in the pallet designation area toward the machine tool indicated in the machine tool designation area in accordance with the moving operation by the inputting device.

According to a second aspect of the present invention, a method of controlling a manufacturing system comprises a step of displaying an operating status of the manufacturing system, including a pallet designation area indicating respective pallets and a machine tool designation area indicating respective machine tools, a step of selecting a desired pallet designation area and executing a moving operation to the desired machine tool designation area on a screen displayed in the displaying step, and a conveyance controlling step of executing the control to carry the pallet indicated in the pallet designation area toward the machine tool indicated in the machine tool designation area in accordance with the moving operation in the inputting step.

DESCRIPTION OF THE PREFERRED EMBODIMENTS

Embodiments of the present invention will hereinafter be described in detail with reference to the drawings.

Figure 1:
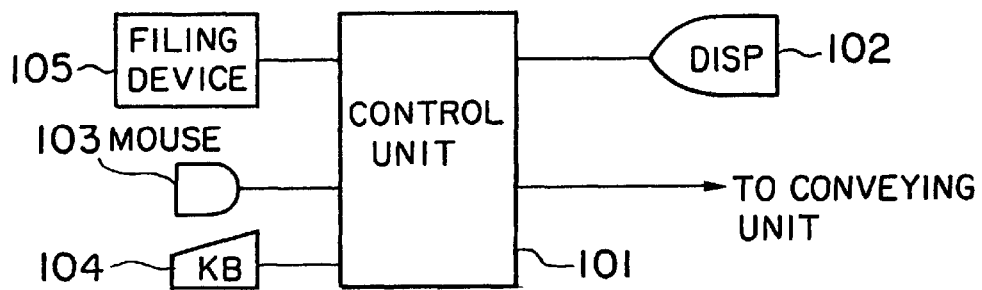
FIG. 1 is a system construction diagram schematically showing a construction of an apparatus for controlling a manufacturing system according to the present invention.

FIG. 1 is a system construction diagram schematically showing a construction of the control apparatus for a manufacturing system according to the present invention.

This control apparatus is constructed to include a control unit 101 to which a display device 102, a mouse 103 serving as a pointing device and a keyboard 104 are connected. The microprocessor-based control device 101 executes a variety of control operations such as data transfer control, display control, carry control, etc. The display device is constructed of a CRT, an LDC etc., and displays a status of system and remote conveyance setting, which will hereinafter be mentioned. The mouse 103 and the keyboard 104 are devices for pointing operations on the screen and inputting the data. Note that other pointing devices such as a track ball etc. are usable on condition that these devices must incorporate dragging and dropping functions.

Figure 2:
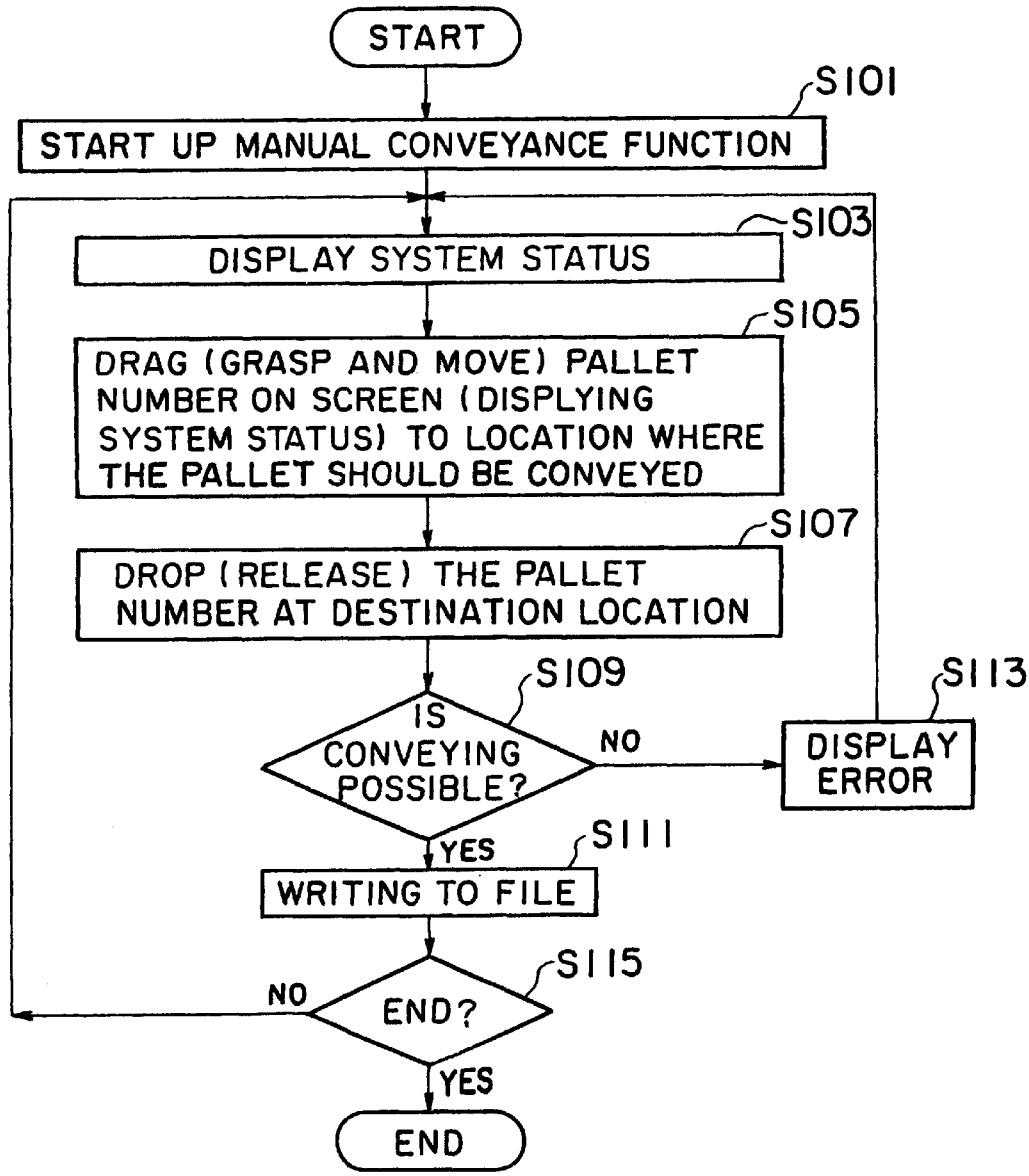
FIG. 2 is a flowchart showing operations of a remote conveyance according to the present invention.

FIG. 2 is a flowchart showing a remote conveyance operation according to the present invention.

To start with, when starting up a manual conveyance function (a remote conveyance function) (step S101), system status display contents are displayed on a screen of the display unit 102 (step S103).

Figure 3:
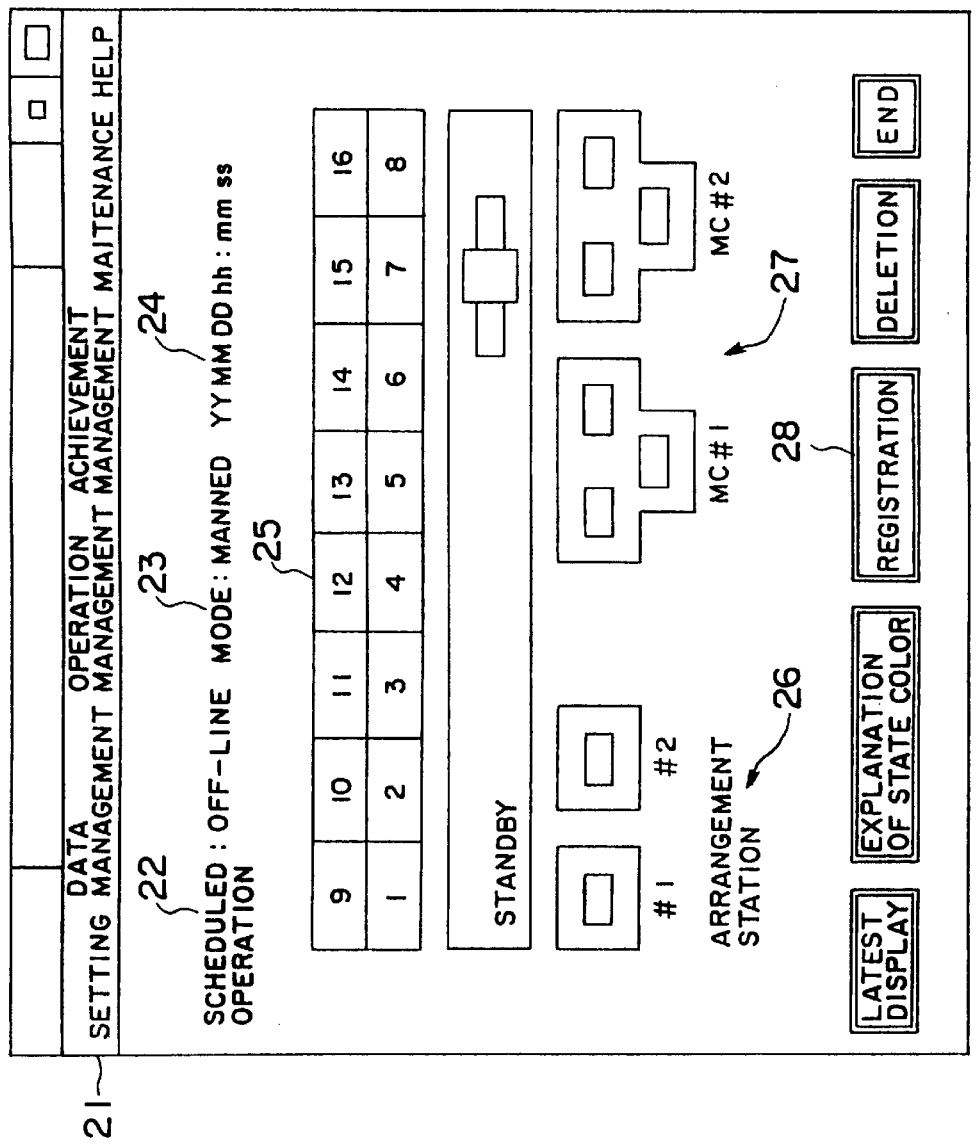
FIG. 3 is a diagram showing one example of display contents of a system status display screen according to the present invention.

FIG. 3 shows one example of the display contents of the system status display screen displayed in step S103.

Herein, [Setting], [Data Management], [Operation Management], [Achievement Management], [Maintenance], [Help] etc. are displayed by way of a menu 21 in an upper part on the screen, and these are selected by properly clicking using the mouse 103. Further, a [Scheduled operation] 22 is [Off-line], and a [Mode] 23 is [Manned]. Moreover, Year/Month/Date data are displayed in the [YY-MM-DD] area 24. Further, in FIG. 3, an arrangement station #1 indicates [Standby].

Figure 6:
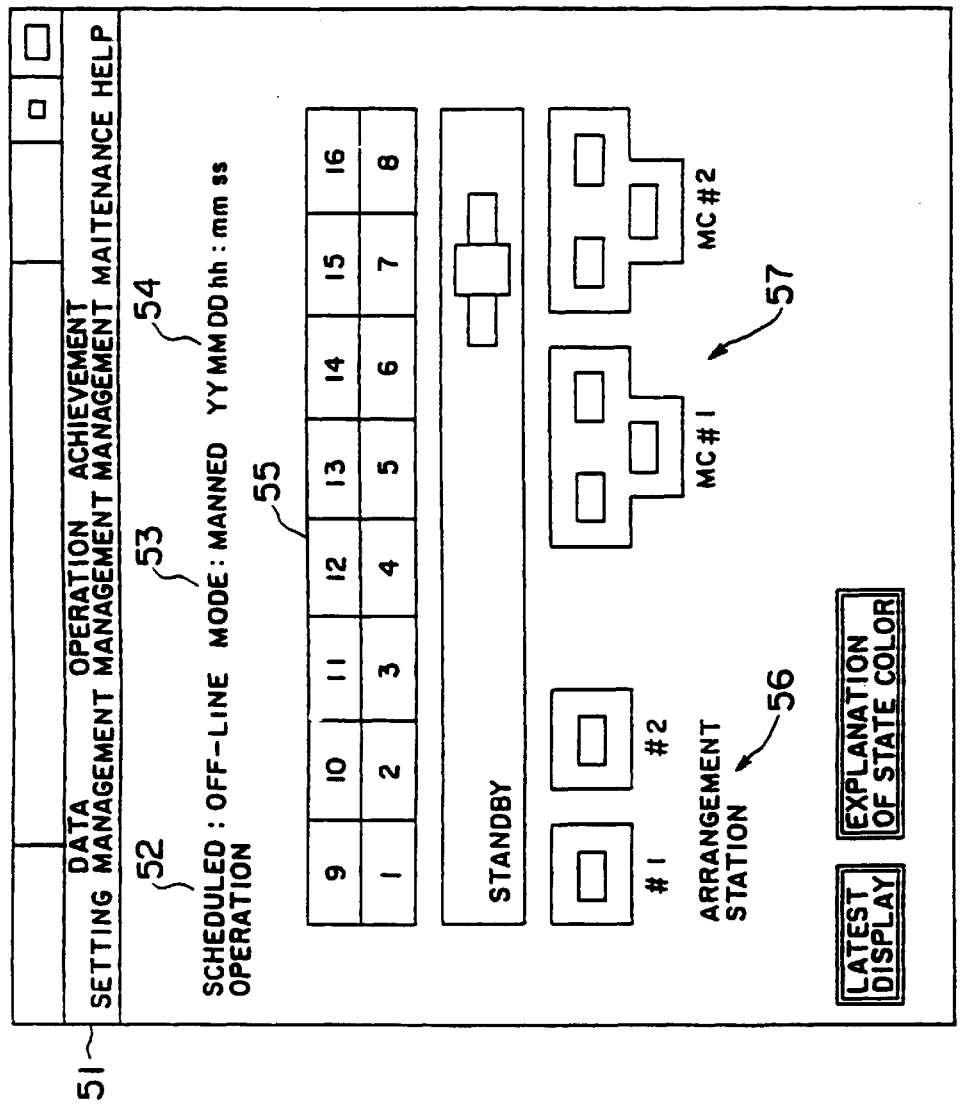
FIG. 6 is a diagram showing one example of display contents of a conventional system status display screen.
Figure 7:
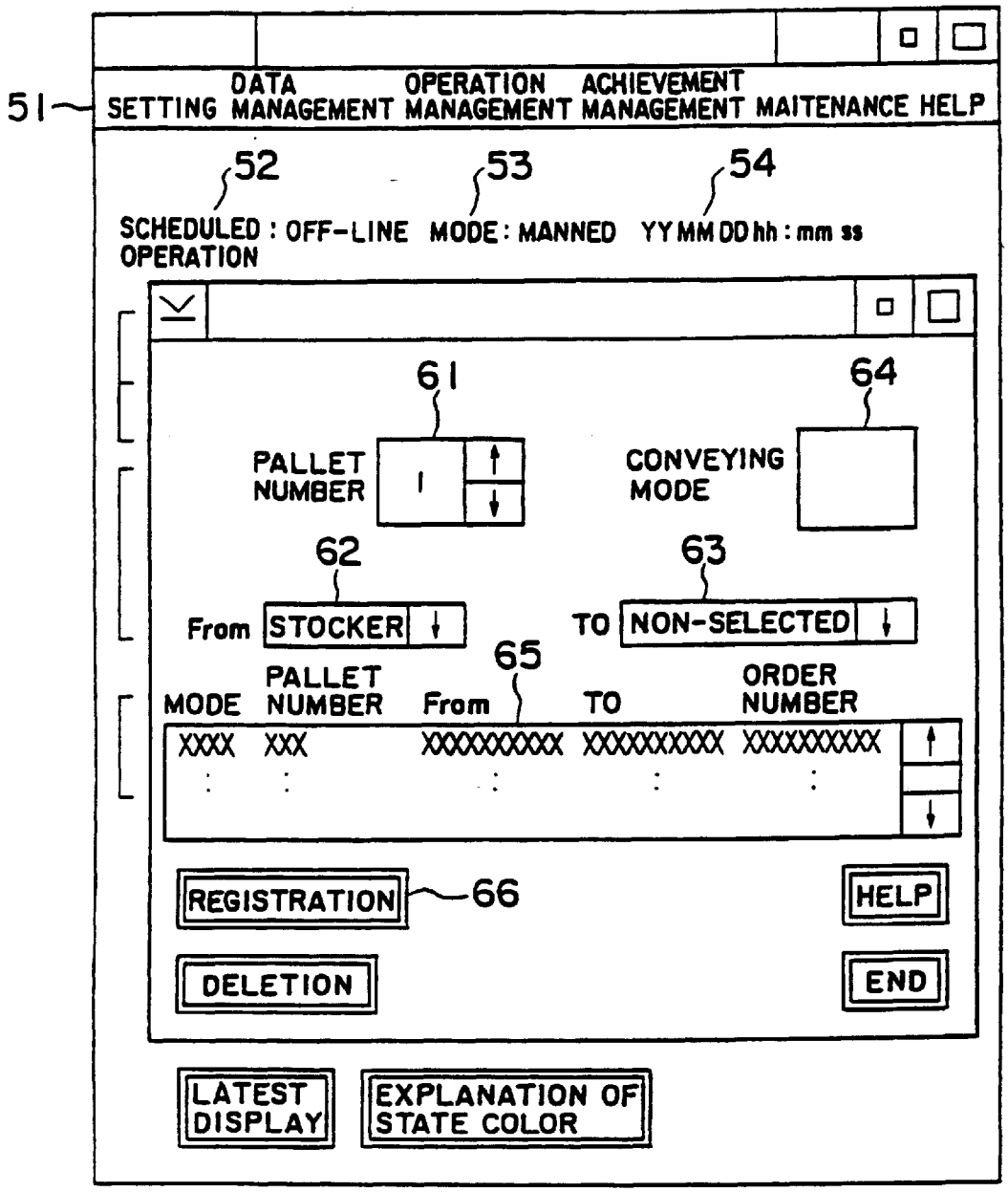
FIG. 7 is a diagram showing one example of display contents of a conventional setting screen.

These display contents described above are the same as those in the example of display contents of the system status display screen in the prior art shown in FIG. 6.

According to the present invention, however, boxes marked with pallet numbers 1–16 are displayed in a pallet designation area 25, and they are properly moved by dragging operations using the mouse 103 as described later. Moreover, the arrangement station designation area 26, a working device designation area 27 etc. are displayed and they are pointed by the mouse 103.

Further, in addition to a [Registration] button 28, buttons for [Deletion] and [End] are provided.

When an item of [Setting] in [Menu 21] is properly selected on the system status display screen, this screen comes into a status for setting the remote conveyance.

Herein, to begin with, a pallet to be carried is selected (grasped) from the box number in the pallet designation area 25 by pushing a left button of the mouse 103 and dragged (which implies a state of moving with the left button of the mouse remains being pushed) (step S105) to a station of the arrangement station designation area 26 or to a position of the working device in the working device designation area 27, and then at the destination, the pallet is dropped (which implies that the left button of the mouse is released) (step S107). With this operation, a desired pallet is chosen, and a conveyance location is set.

Figure 4A:
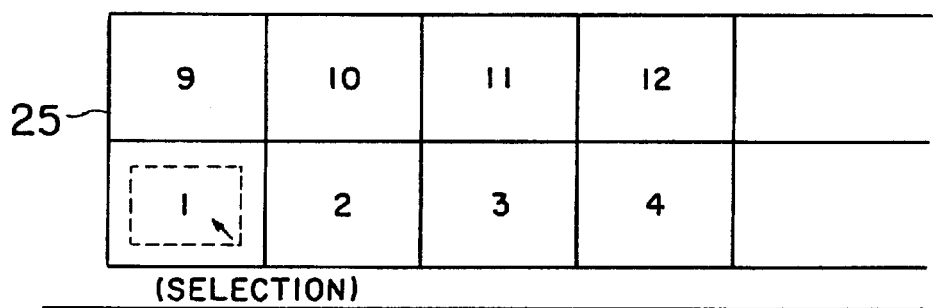
FIGS. 4A–4C are explanatory diagrams showing an operation of giving an indication to carry a pallet.
Figure 4B:
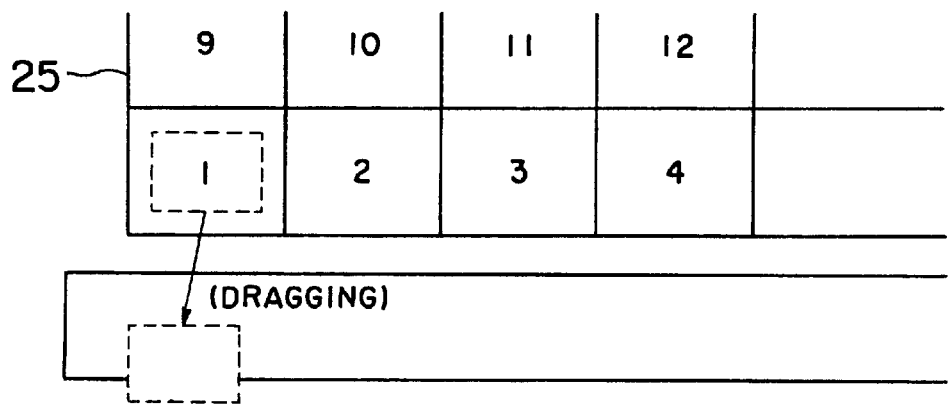
Figure 4C:
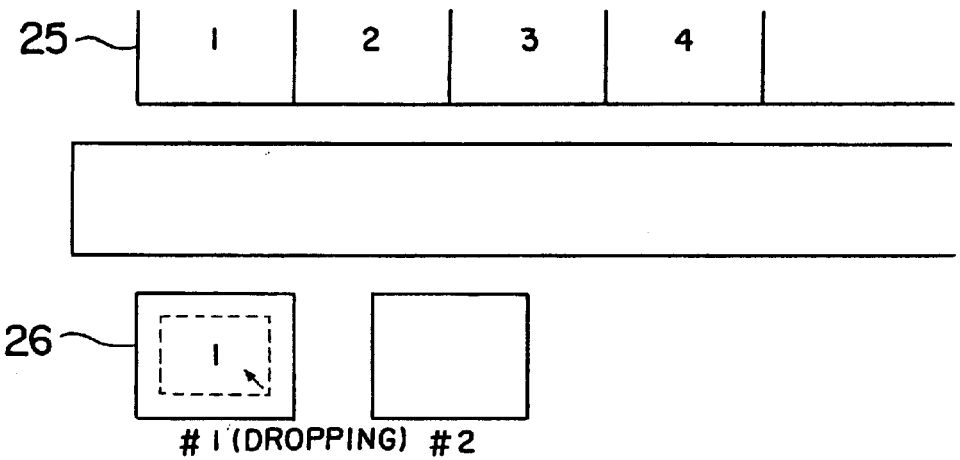
Figure 5:
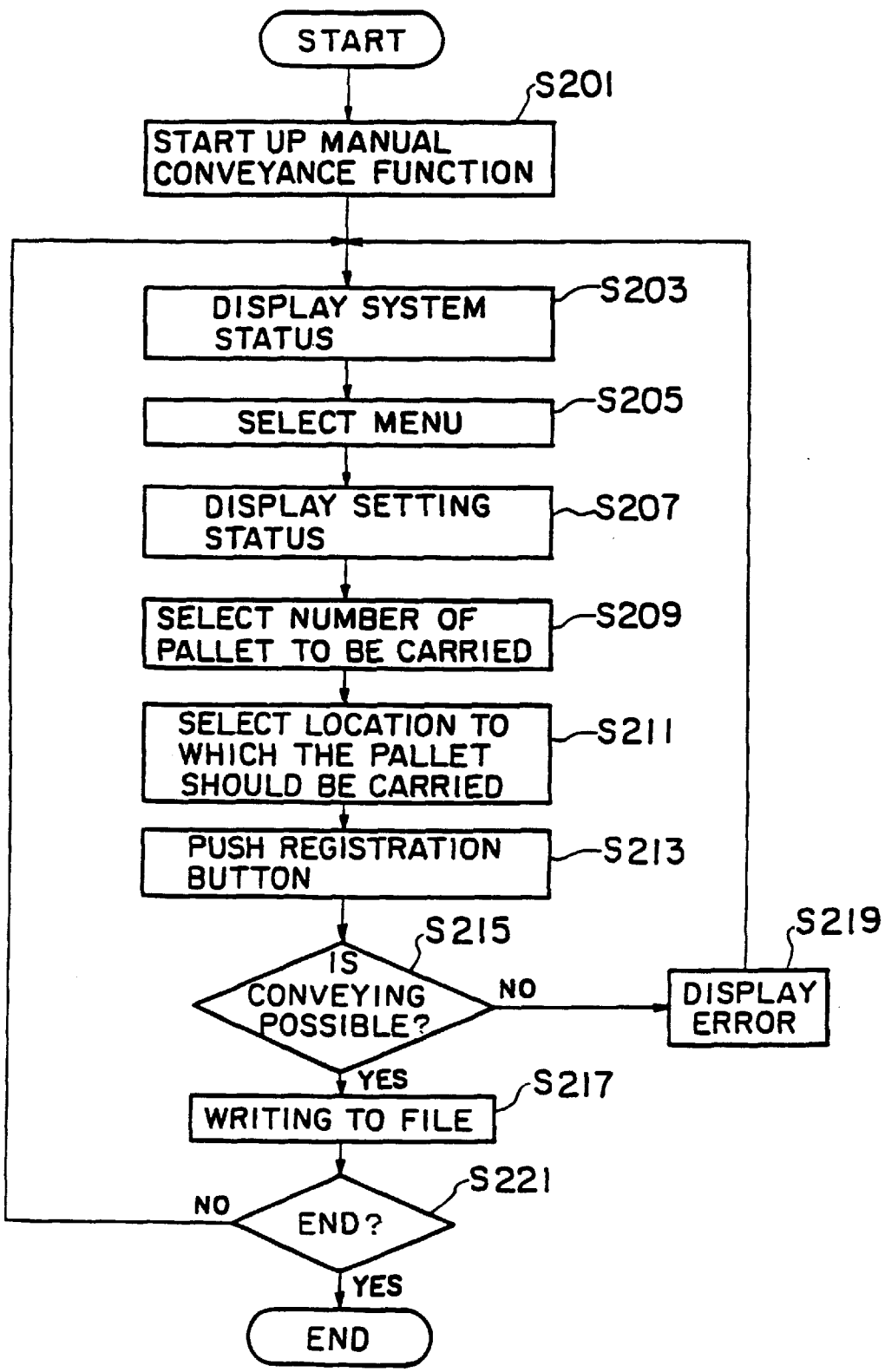
FIG. 5 is a flowchart showing operations of a remote conveyance in a prior art FMS.

FIGS. 4A–4C are explanatory diagrams each showing an operation to indicate conveyance of the pallet.

FIG. 4A shows that the pallet of the pallet number 1 in the pallet designation area 25 is selected by locating a cursor to the pallet number 1 and pushing the left button. FIG. 4B shows that the movement of the pallet number 1 by dragging. Further, FIG. 4C shows that the pallet number 1 is dropped in the station #1 in the arrangement station designation area 26. With these operations, the pallet number 1 is displayed in the display area of the station #1.

The operator confirms a result of the thus performed operations and, when the setting is finished, pushes the [Registration] button 28. Then, a verification if this conveyance is possible is performed (step S109), and if the conveyance is possible, from-to locations are written to a file (step S111). Whereas if the conveyance is impossible (step S109), an error is displayed (step S113). Note that the operation of pushing the [Registration] button 28 is done for confirmation and may be omitted.

With such operations, a signal indication of the remote conveyance is registered, and the conveyance is started. When executing a next operation in step S115, the processing returns to step S103. If no other carrying operations are implemented, the program comes to an end.

Further, when there is a box in which the pallet number is displayed in the arrangement station designation area 26 or the working device designation area 27, by moving the box to a predetermined location by dragging and dropped operations, it makes feasible to set an indication of remote-conveyance of a predetermined pallet from the station or the working device to other station or other working device.

Further, the display unit may display status of the machine tool by displaying a pallet for which the conveyance operation has been executed in said machine tool designation area.

In the discussion made so far, the pallet designation area 25, the arrangement station designation area 26 and the working device designation area 27 are displayed by use of the boxes and the numbers and may also be displayed by properly using, in addition to the above-mentioned, icons and symbols etc.

As discussed above, according to the present invention, the conveyance is indicated on the system status display screen on which the statuses of the respective devices and the working statuses of the work are displayed, and hence the indication of the remote conveyance can be set while monitoring the system.

It is apparent that, in this invention, a wide range of different working modes can be formed based on the invention without deviating from the spirit and scope of the invention. This invention is not restricted by its specific working modes except being limited by the appended claims.

What is claimed is:

1. An apparatus for controlling a manufacturing system, comprising:

a display configured to display an operating status of the manufacturing system, said display including a pallet designation area for selecting a desired pallet and a machine tool designation area for selecting a desired machine tool;

an input device for selecting the desired pallet and the desired machine tool and executing a moving operation of the desired pallet to the desired machine tool; and a conveyance controller configured to execute a conveyance operation in response to the moving operation to carry the desired pallet toward the desired machine tool, wherein said display indicates a status of the machine tool by displaying a pallet for which the conveyance operation has been executed in the machine tool designation area, and the pallet designation area occupies a part of the display so as not to obscure display of the operating status.

2. The apparatus for controlling the manufacturing system according to claim 1, wherein said pallet designation area or said machine tool designation area is an icon for displaying a number or a symbol of said pallet or said machine tool.

3. The apparatus for controlling the manufacturing system according to claim 1, wherein said inputting means is a pointing device which indicates the conveyance by dragging said desired pallet designation area and dropping said pallet designation area in said desired machine tool designation area.

4. The apparatus for controlling the manufacturing system according to claim 3, wherein said pointing device is a mouse.

5. The apparatus for controlling the manufacturing system according to claim 1, further comprising:

a file device for storing conveyance data, if the conveyance is confirmed to be possible in terms of a relationship between a designated side and a designated destination side.

6. A method of controlling a manufacturing system, comprising:

displaying an operating status of the manufacturing system on a display screen, including a pallet designation area and a machine tool designation area, so that the pallet designation area and the machine tool designation area occupy a portion of the display screen without obscuring display of the operating status;

selecting a desired pallet from the pallet designation area using an input device and executing a moving operation to the desired machine tool in the machine tool designation area; and executing a conveyance operation in response to the moving operation to carry the desired pallet toward the desired machine tool.

7. The method of controlling the manufacturing system according to claim 6, wherein said displaying step involves displaying a status of said machine tool by displaying, in said machine tool designation area, said pallet indicated in said pallet designation area in which the moving operation has been executed.

8. The method of controlling the manufacturing system according to claim 6, wherein the moving operation is an operation of dragging said pallet designation area and dropping said pallet designation area in said machine tool designation area.

* * * * *